Dec. 13, 1955 J. J. SULLIVAN 2,726,874
CONVERTIBLE GOLF CASE AND CART
Filed Nov. 3, 1953 2 Sheets-Sheet 1
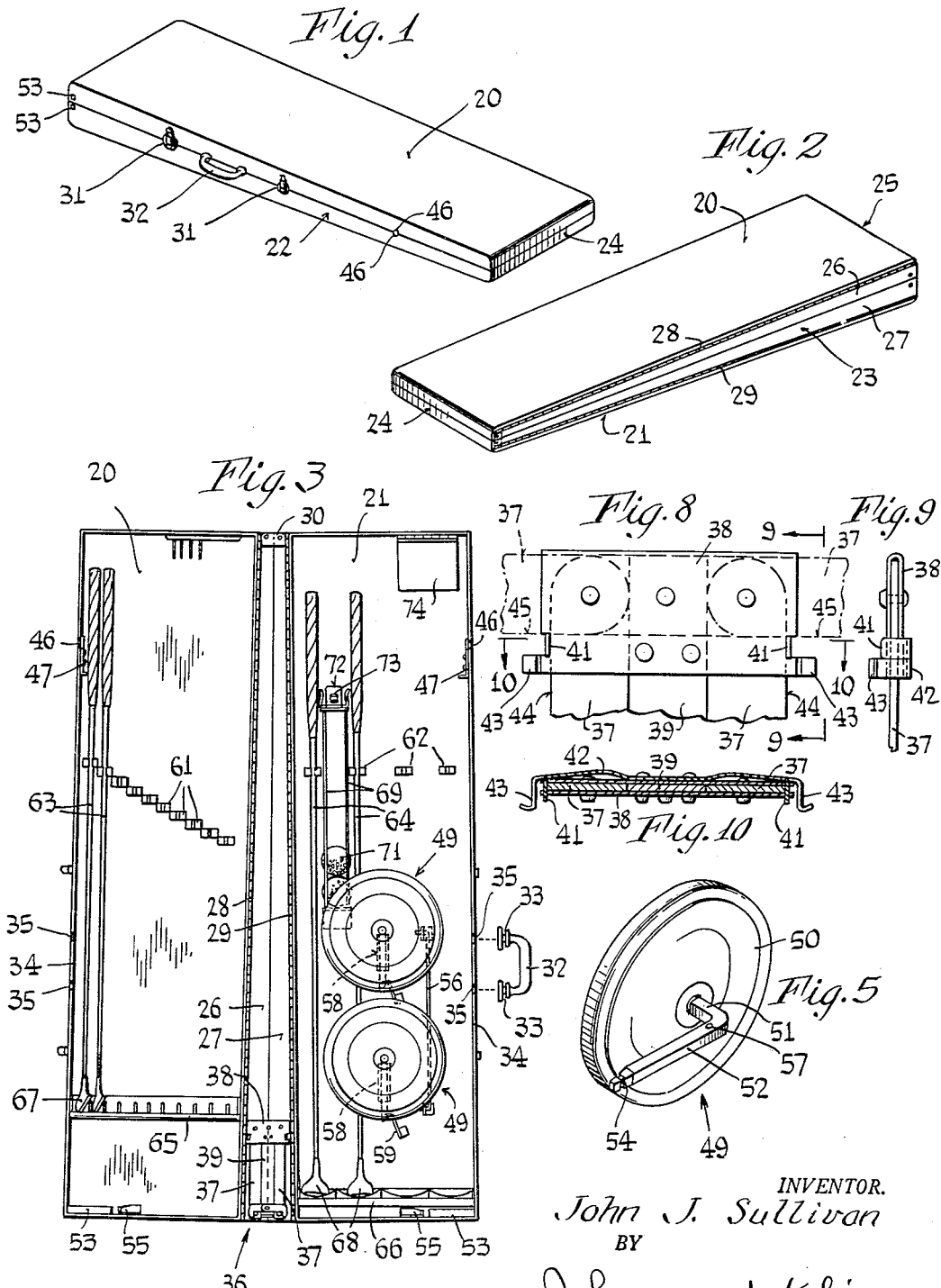
INVENTOR.
John J. Sullivan
BY
Johnson and Kline
ATTORNEYS

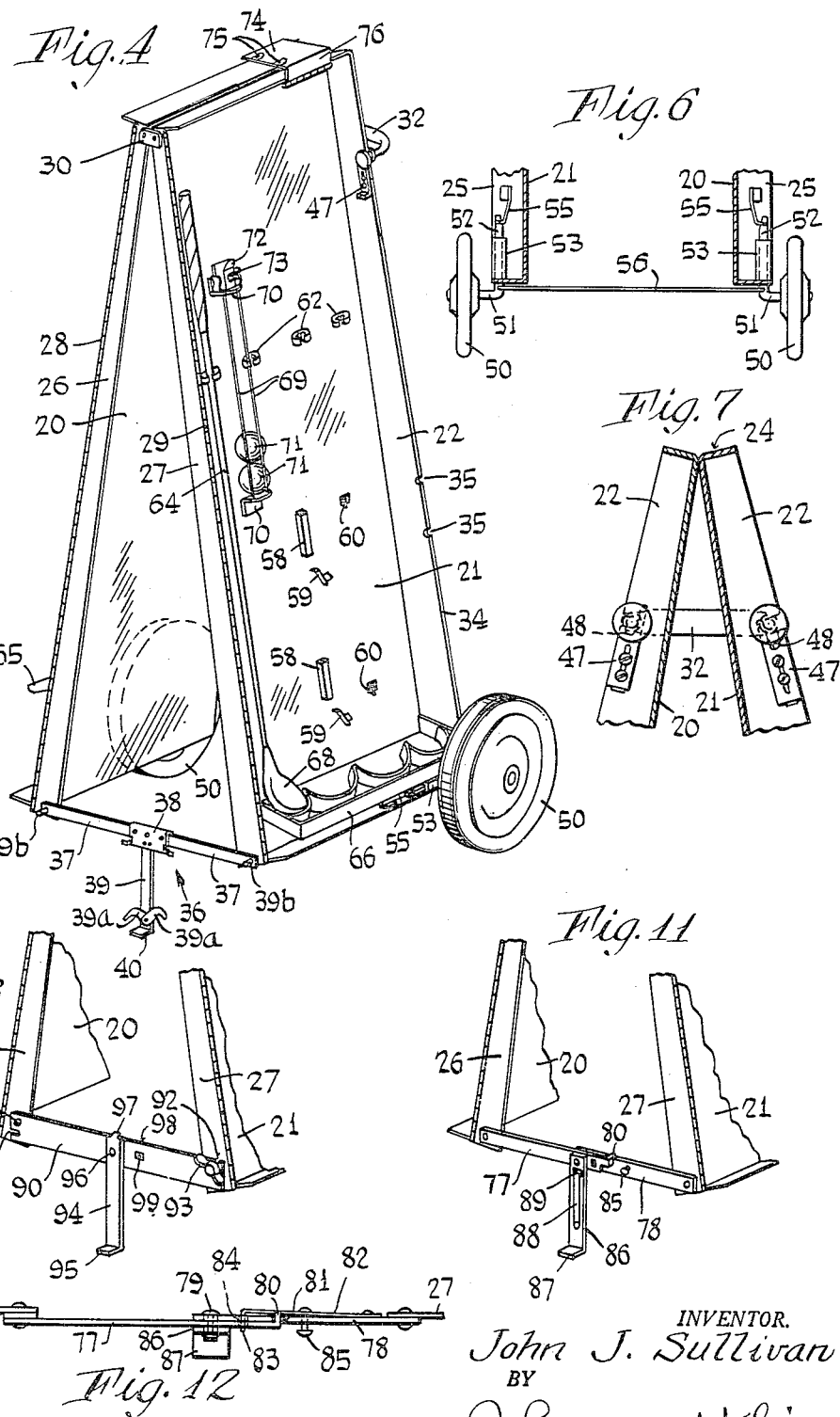

United States Patent Office 2,726,874
Patented Dec. 13, 1955

2,726,874

CONVERTIBLE GOLF CASE AND CART

John J. Sullivan, Norfolk, Va.

Application November 3, 1953, Serial No. 389,997

19 Claims. (Cl. 280—37)

This invention relates to convertible golfing equipment, and more particularly to golf cases which are convertible to golf carts and vice versa.

An object of the invention is to provide an improved convertible golf case and cart which is relatively small, compact and easily transportable when set up as a carrying case, and which when set up as a cart holds, in fully exposed, accessible positions a large number and variety of golf clubs, enabling quick and easy selection and removal of any desired club.

Another object of the invention is to provide a combination convertible golf case and golf cart in accordance with the foregoing, which may be easily and quickly converted from a case to a cart and vice versa.

Still another object of the invention is to provide an improved convertible golf case and cart which may be easily manipulated, either when transporting the device as a completely enclosed case or when using the device on the golf links as a cart.

A feature of the invention resides in the provision of a novel convertible golf case and cart having a single handle means common to both the case and cart, said handle means constituting a bracing structure for certain components when the device is set up as a cart.

Another feature of the invention resides in the provision of a novel convertible golf case and cart in which the case is the form of a flat, relatively shallow, elongate, generally rectangular box and in which the cart formed by the case is characterized by the two large sides of the case being mounted in back-to-back, convergent relation whereby the interiors thereof are outwardly exposed and the equipment carried thereby made readily accessible for use.

A still further object of the invention is to provide an improved and novel convertible golf case and cart which is strong and sturdy in construction and in operation, regardless of whether the device is set up as a carrying case or a cart.

Yet another object of the invention is to provide an improved convertible golf case and cart as above set forth, in which all of the golf clubs and other equipment may be wholly contained within the case and the case locked to prevent pilferage or loss.

Other features and advantages will hereinafter appear.

In the accompanying drawings:

Figure 1 is a front perspective view of the golf case of this invention.

Fig. 2 is a rear perspective view of the golf case.

Fig. 3 is an elevational view of the golf case opened and partially set up, with the large sides disposed 180 degrees with relation to each other, that is, lying in a common plane.

Fig. 4 is a perspective view of the golf case completely set up and converted into a cart.

Fig. 5 is a perspective view of one wheel assemblage of the golf cart.

Fig. 6 is a fragmentary horizontal sectional view showing the wheel assemblages in position when the golf case is set up as a cart.

Fig 7 is a fragmentary vertical sectional view, showing the handle supporting portion of the golf case and cart.

Fig. 8 is a fragmentary elevational view of the center pivot assemblage of the rear brace and foot of the golf cart.

Fig. 9 is a fragmentary vertical section taken on line 9—9 of Fig. 8.

Fig. 10 is a fragmentary horizontal section taken on line 10—10 of Fig. 8.

Fig. 11 is a fragmentary perspective view of a modified form of rear brace and leg support.

Fig. 12 is a top view of the brace and leg support of Fig. 11.

Fig. 13 is a fragmentary perspective view of another modified form of rear brace and leg support.

Referring to Figs. 1, 2 and 3 showing one embodiment of the present invention, the combination golf case and golf cart comprises a substantially flat, six-sided elongate case having a pair of relatively large, opposite, generally rectangular sides 20 and 21 which normally face each other in spaced relation when the case is closed as illustrated in Figs. 1 and 2. The sides 20 and 21 constitute two main, relatively movable and separable parts of the case, each of said sides having an appreciably greater area than any one of the remaining sides of the case. The said remaining sides comprise a front side 22, a rear side 23 and end sides 24 and 25, and these remaining sides each have two parts which are narrow and coextensive, the parts of the sides 22 and 23 being of the same length as the large sides 20 and 21, and the coextensive parts of the sides 24 and 25 having a length equal to the width of the large sides 20 and 21. When the case is opened, the respective parts of the sides 22, 24 and 25 separate from each other, being rigidly attached to the adjacent edge portions of the large sides 20 and 21.

In accordance with the present invention the golf case shown in Figs. 1 and 2 is so arranged and constructed that it may be opened and the large sides 20 and 21 thereof swung through a 360 degree arc whereby they are disposed back to back, thereby to fully expose and make accessible the interior of said large sides and golfing equipment which is carried thereby. Also, the large sides 20 and 21 may be angularly disposed, when back to back, so as to lie in convergent planes and provide the effect of a large base at one end of the opened case, to enable the case to be readily used as a cart capable of standing on end. Thus not only will the contents of the case be made completely accessible, but the case when set up as a cart may be readily wheeled over the golf course, eliminating the necessity for carrying any of the golfing equipment, such as golf clubs, balls, etc., since these may be readily removably mounted on the interior surfaces of the large sides 20 and 21.

In accomplishing this I fabricate the rear side 23 of the case so as to have parts 26 and 27 secured by elongate hinges 28 and 29, similar to piano hinges, to the large sides 20 and 21 of the case. Also, at one pair of ends, the parts 26 and 27 are pivotally joined together by a short link 30 located inside of the case.

The front narrow side 22 of the case has releasable luggage toggle clamps 31 and a rigid carrying handle 32, the latter having at its extremities annular grooves 33 receiving the adjacent edge portions 34 of the front side 22. The edge portions 34 are provided with semicircular notches 35 to admit the ends of the handle 32, and the said handle is readily removable from the case when the latter is opened, as shown in Fig. 3.

At the other pair of ends of the parts 26 and 27 of the rear side 23 an articulated brace 36 is connected, Figs. 3 and 4, said articulated brace comprising a pair of strut members 37 pivoted respectively to the parts 26 and 27 and pivoted to a connector plate 38 which rigidly carries a depending leg 39 having a laterally extended foot 40. The brace 36 is foldable from the extended position of Fig. 4 to a collapsed position as shown in Fig. 3, and is locked in either extended or folded position by lugs 41 of a leaf spring 42 secured to the plate 38, said leaf spring having finger-engageable tabs 43 which may be flexed to shift the lugs 41 out of the path of movement of the strut members 37. The lugs 41 engage outside edges 44 of the strut members 37 when the brace is folded or collapsed, and engage opposite or bottom edges 45 of the members 37 when the brace is extended.

In addition to the locking of the strut members 37 by the lugs 41, I provide a pair of hooks 39a engageable with extensions 39b of the pivot pins for the strut members 37. When the parts 26 and 27 of the casing side 23 are juxtaposed as shown in Fig. 3 the hooks 39a by engagement with the extensions 39b will lock the assemblage against relative movement and prevent accidental opening of the case at the narrow side 23.

As seen in Fig. 3 when the base 36 is folded and locked in folded position it maintains the parts 26 and 27 of the case side 23 juxtaposed without any intervening space, and movement of the brace 36 from folded to extended position, Fig. 4, will swing the parts 26 and 27 of the case angularly apart whereby they are convergent, as made possible by the pivot link 30.

Such action therefore sets up the case preparatory to converting it into a cart. The handle 32 is removed from whichever of the parts of the case side 22 it has remained on, and is attached to the said parts at a different location, being received in notches 46 so as to extend across the space between the separated parts of the side 22 adjacent the converged ends of said parts. The handle 32 is retained in this position, Figs. 4 and 7, by slide catches 47 having slotted ends 48 receivable in the grooves 33 of the handle.

Referring to Figs. 3 through 6 I provide a pair of removable wheel assemblages 49, each assemblage including a wheel 50, an axle 51 rotatably carrying the wheel and an arm 52 extending at right angles to the axle 51. The arms 52 are preferably of square cross section and are receivable in a pair of square sockets 53 provided on the respective parts of the side 25 of the case. The ends of the arms 52 have notches 54 engaged by spring clips 55 by which the arms are releasably detained in the sockets 53. A strut rod 56 extends between the arms 52 when the wheel assemblages are in operative position, as shown in Figs. 4 and 6, said strut rod having angularly extended ends received in holes 57 bored through the arms 52.

When the cart is dismantled and converted into a carrying case the wheel assemblages 49 are removed from their operative positions and stored on the inside of the large side 21 of the case, the arms 52 being received in sockets 58 and being retained by spring clips 59. The wheels 50 thus are positioned flat with respect to the side 22 but spaced therefrom. The strut rod 56 is carried by a pair of angle brackets 60 secured to the side 21, Fig. 4.

The case sides 20 and 21 are provided with spring clips 61 and 62 for the shanks 63 and 64 of golf clubs whereby the clubs may be releasably held by said sides in neatly arranged, readily accessible positions.

I provide a pair of trays 65 and 66 to accommodate the heads 67 and 68 of the golf clubs, the tray 65 being secured to the interior of the side 20 and being positioned above the tray 66 which is secured to the interior of the side 21 as shown in Fig. 3.

The tray 65 is so arranged that its edge is spaced from the side 21 of the case when the case closed, thereby to provide clearance for the shanks 64 of the golf clubs.

For the purpose of holding a number of golf balls I provide a rack comprising a pair of resilient rods 69 disposed parallel to each other in spaced relation and secured to the side 21 of the case by brackets 70. Golf balls 71 carried in the rack may be readily removed therefrom when shifted to a position intermediate the ends of the resilient rods 69, by springing the rods slightly apart. The bracket 70 has a spring clip 72 to accommodate a pack of cigarettes, and a spring clip 73 to hold a lighted cigarette when the golfer is making a swing.

A hinged plate 74 having spring clips 75 is secured to one part of the side 24 of the case for holding a score pad and pencil, said plate having an angularly extended supporting base 76 enabling it to nest against the inside corner of the case when it is swung down from extended position of Fig. 4.

A modified form of articulated brace is shown in Figs. 11 and 12. The brace shown in these figures may be substituted for the brace 36 described above, and comprises a pair of strut members 77 and 78 pivotally connected with the parts 26 and 27 of the side 23. The strut members 77 and 78 are joined to each other by a pivot bolt or rivet 79 and have a cooperating tongue 80 and slot 81 to limit their unfolding movement to the aligned positions shown in Figs. 11 and 12. A releasable lock for the strut members 77 and 78 is provided, in the form of a leaf spring 82 having a tongue 83 receivable in aligned openings 84 of the strut members, said leaf spring being actuatable by a fingerpiece 85 comprising a rivet secured intermediate the ends of the spring.

A depending leg 86 having a foot 87 is secured under the rivet 79, the leg 86 having a leaf spring 88 provided with a tongue 89 extending through an opening in the leg 86 and engageable with the strut members 77 and 78 to maintain the leg 86 in its right-angle, depending position when the case is set up as a cart.

Another modified form of brace which may be substituted for the brace 36 described above is shown in Fig. 13. The brace of Fig. 13 comprises a single, rigid strut member 90 pivoted at 91 to the part 26 and having at its other end a slot 92 for receiving a wing screw 93 threaded to the part 27. A depending leg 94 having a foot 95 is pivoted by a rivet 96 to the strut 90, said leg having a yieldable detent finger 97 engageable either with the top edge 98 of the strut 90 or in a recess 99 in the strut to position the leg respectively at right angles or parallel to the strut member. The strut member 90 has a second notch 100 adjacent the pivot 91, adapted to receive the wing screw 93 when the strut member is swung upward and to the left as viewed in Fig. 13 and the parts 26 and 27 brought together, thereby to hold the parts 26 and 27 against separation when the case is closed.

Variations and modifications may be made within the scope of the claims and portions of the improvements may be used without others.

I claim:

1. A knock-down golf cart comprising a substantially flat, elongate case having a plurality of sides in excess of two, including a pair of relatively large, opposite oblong sides facing each other in spaced relation, said sides constituting two main relatively movable and separable parts of the case, each of said sides having an appreciably greater area than any one of the remaining sides of the case; releasable means for holding said sides in said mutually facing, spaced, case-forming positions including hinges connected with one correspondnig pair of long edges of the oblong sides and having their axes substantially parallel to said edges; releasable means for holding the sides back-to-back when released and swung about said hinges from said case-forming positions, with the lower pair of corresponding short edges of the sides more widely spaced apart than the upper pair of short edges whereby the sides lie in upwardly convergent planes; a pair of wheels storable in said case; means for releasably mounting said wheels in operative positions adjacent the said lower pair of corresponding short edges of the sides to enable the sides when back-to-back to be wheeled like a cart; and rack means on said sides for releasably holding golf clubs, said rack means being exposed when the sides are back-to-back whereby the clubs are accessible for removal and use.

2. A knock-down golf cart comprising a substantially flat, elongate case having a plurality of sides in excess of two, including a pair of relatively large, opposite oblong sides facing each other in spaced relation, said sides constituting two main relatively movable and separable parts of the case, each of said sides having an appreciably greater area than any one of the remaining sides of the case; means connecting said opposite sides for relative movement, including coextensive sets of hinges connected with one corresponding pair of long edges of the oblong sides and having their axes substantially parallel to said edges, said means enabling the sides when the case is opened to be placed back-to-back with the lower pair of corresponding short edges of the sides more widely spaced apart than the other pair of short edges whereby the sides lie in upwardly convergent planes; releasable means for holding said sides in said convergent, back-to-back relation; a pair of wheels storable in said case; means for releasably mounting said wheels in operative positions adjacent the said lower pair of corresponding short edges of the sides to enable the sides when back-to-back to be wheeled like a cart; and rack means on said opposite sides for releasably holding golf clubs, said rack means being exposed when the sides are back-to-back whereby the clubs are accessible for removal and use.

3. A knock-down golf cart comprising a substantially flat, elongate case having a plurality of sides in excess of two, including a pair of relatively large, opposite generally rectangular sides facing each other in spaced relation, said sides constituting two main relatively movable and separable parts of the case, each of said sides having an appreciably greater area than any one of the remaining sides of the case; compound hinge means connecting said opposite sides for relative movement, including coextensive sets of hinges connected with one corresponding pair of long edges of the sides and having their axes substantially parallel to said edges, and including an additional hinge connected to said sets of hinges, said means enabling the sides when the case is opened to be swung into back-to-back positions with the lower pair of corresponding short edges of the sides more widely spaced apart than the upper pair of short edges whereby the sides lie in upwardly convergent planes; releasable means for holding said sides in said convergent, back-to-back relation; a pair of wheels storable in said case; means for releasably mounting said wheels in operative positions adjacent the said lower pair of corresponding short edges of the opposite sides to enable the sides when back-to-back to be wheeled like a cart; and rack means on said opposite sides for releasably holding golf clubs, said rack means being exposed when the sides are back-to-back whereby the clubs are accessible for removal and use.

4. A knock-down golf cart comprising a substantially flat, elongate case having a plurality of sides in excess of two, including a pair of relatively large, opposite generally rectangular sides facing each other in spaced relation, said sides constituting two main relatively movable and separable parts of the case, each of said sides having an appreciably greater area than any one of the remaining sides of the case; hinge means connecting said opposite sides for relative movement, enabling the sides when the case is opened to be swung into back-to-back positions with one pair of corresponding ends of the sides more widely spaced apart than the other pair of ends whereby the sides lie in convergent planes; releasable means for holding said sides in said convergent, back-to-back relation; a pair of wheels storable in said case; means for releasably mounting said wheels in operative positions adjacent the said one pair of corresponding ends of the opposite sides to enable the sides when back-to-back to be wheeled like a cart; and rack means on said opposite sides for releasably holding golf clubs, said rack means being exposed when the sides are back-to-back whereby the clubs are accessible for removal and use, one of the remaining sides of the case adjoining and connecting the said large sides, said one remaining side having two parts and said hinge means comprising hinges connecting said parts respectively to said large sides and comprising a hinge connection between said two parts.

5. The invention as defined in claim 4 in which the two parts of the said one remaining side are narrow and coextensive and have substantially the same lengths as the said two large sides, and in which the hinge connection is located at the upper pair of corresponding ends of said parts.

6. A knock-down golf cart comprising a substantially flat, elongate case having a plurality of sides in excess of two, including a pair of relatively large, opposite generally rectangular sides facing each other in spaced relation, said sides constituting two main relatively movable and separable parts of the case, each of said sides having an appreciably greater area than any one of the remaining sides of the case; hinge means connecting said opposite sides for relative movement, enabling the sides when the case is opened to be swung into back-to-back positions with one pair of corresponding ends of the sides more widely spaced apart than the other pair of ends whereby the sides lie in convergent planes; releasable means for holding said sides in said convergent, back-to-back relation; a pair of wheels storable in said case; means for releasably mounting said wheels in operative positions adjacent the said one pair of corresponding ends of the opposite sides to enable the sides when back-to-back to be wheeled like a cart; rack means on said opposite sides for releasably holding golf clubs, said rack means being exposed when the sides are back-to-back whereby the clubs are accessible for removal and use, said hinge means connecting together one pair of corresponding longitudinal edges of the large sides; a carrying handle adapted to be removably mounted on the other pair of corresponding longitudinal edges of the large sides intermediate the ends thereof, for transporting the case; and cooperable means on said handle and on corresponding ends of the said other pair of edges, for mounting the handle thereon when the sides are back-to-back, said handle thereby retaining said sides in back-to-back relation and providing a hand grip for wheeling the cart.

7. The invention as defined in claim 6 in which one of the remaining sides of the case adjoins and connects to said large sides, said one side having two narrow, coextensive parts respectively rigidly connected to and having substantially the same length as the said large sides, said two parts being included in both the said mounting means for the carrying handle.

8. A knock-down golf cart comprising a substantially flat, elongate case having a plurality of sides in excess of two, including a pair of relatively large, opposite sides facing each other in spaced relation, said sides constituting two main relatively movable and separable parts of the case, each of said sides having an appreciably greater area than any one of the remaining sides of the case; releasable means for holding said sides in said mutually facing, spaced, case-forming positions; releasable means for holding the sides back-to-back when released from said case-forming positions, with one pair of corresponding ends of the sides more widely spaced apart than the other pair of ends whereby the sides lie in convergent planes; a pair of wheels storable in said case; means for releasably mounting said wheels in operative positions adjacent the the said one pair of corresponding ends of the sides to enable the sides when back-to-back to be wheeled like a cart; and rack means on said sides for releasably holding golf clubs, said rack means being exposed when the sides are back-to-back whereby the clubs are accessible for removal and use, said rack means including a pair of trays mounted respectively on the two lower portions of said sides and projecting from the inner surfaces thereof, for receiving and supporting the heads of the clubs, said trays being located one above the other when the case is closed and in upright position, the lower tray being adapted to hold longer clubs and the upper tray being adapted to hold shorter clubs, said upper tray extending short of the opposite side of the case to provide clearance for the shafts of the longer clubs.

9. The invention as defined in claim 5 in which the releasable means for holding the said larger sides in convergent back-to-back relation include a strut movably mounted on the lower end of one of said parts, and include cooperable means on said strut and the lower end of the other of said parts for releasably connecting said strut thereto.

10. The invention as defined in claim 9 in which there are cooperable means on said strut and lower end of the other of said parts, for holding the lower ends of the parts closely juxtaposed when the case is closed.

11. The invention as defined in claim 9 in which there is a depending foot carried by said strut for engagement with the ground when the strut is holding the sides back-to-back, said foot providing with said wheels a three-point support for the cart.

12. A knock-down golf cart comprising a substantially flat, elongate case having a plurality of sides in excess of two, including a pair of relatively large, opposite sides facing each other in spaced relation, said sides constituting two main relatively movable and separable parts of the case, each of said sides having an appreciably greater area than any one of the remaining sides of the case; releasable means for holding said sides in said mutually facing, spaced, case-forming positions; releasable means for holding the sides back-to-back when released from said case-forming positions, with one pair of corresponding ends of the sides more widely spaced apart than the other pair of ends whereby the sides lie in convergent planes; a pair of wheels storable in said case; means for releasably mounting said wheels in operative positions adjacent the said one pair of corresponding ends of the sides to enable the sides when back-to-back to be wheeled like a cart; and rack means on said sides for releasably holding golf clubs, said rack means being exposed when the sides are back-to-back whereby the clubs are accessible for removal and use, said releasable means which holds the sides back-to-back including a strut extending between said one pair of corresponding ends and being releasable from at least one of said ends.

13. A knock-down golf cart comprising a substantially flat, elongate case having a plurality of sides in excess of two, including a pair of relatively large, opposite sides facing each other in spaced relation, said sides constituting two main relatively movable and separable parts of the case, each of said sides having an appreciably greater area than any one of the remaining sides of the case; releasable means for holding said sides in said mutually facing, spaced, case-forming positions; releasable means for holding the sides back-to-back when released from said case-forming positions, with one pair of corresponding ends of the sides more widely spaced apart than the other pair of ends whereby the sides lie in convergent planes; a pair of wheels storable in said case; means for releasably mounting said wheels in operative positions adjacent the said one pair of corresponding ends of the sides to enable the sides when back-to-back to be wheeled like a cart; and rack means on said sides for releasably holding golf clubs, said rack means being exposed when the sides are back-to-back whereby the clubs are accessible for removal and use, said releasable means which holds the sides back-to-back including a pair of spaced releasable struts extending between the said one pair of corresponding ends of the sides, one of said struts being located between said wheels.

14. A knock-down golf cart comprising a substantially flat, elongate case having a plurality of sides in excess of two, including a pair of relatively large, opposite generally rectangular sides facing each other in spaced relation, said sides constituting two main relatively movable and separable parts of the case, each of said sides having an appreciably greater area than any one of the remaining sides of the case; hinge means connecting said opposite sides for relative movement, enabling the sides when the case is opened to be swung into back-to-back positions with one pair of corresponding ends of the sides more widely spaced apart than the other pair of ends whereby the sides lie in convergent planes; releasable means for holding said sides in said convergent, back-to-back relation; a pair of wheels storable in said case; means for releasably mounting said wheels in operative positions adjacent the said one pair of corresponding ends of the opposite sides to enable the sides when back-to-back to be wheeled like a cart; and rack means on said opposite sides for releasably holding golf clubs, said rack means being exposed when the sides are back-to-back whereby the clubs are accessible for removal and use, said case being six-sided and the four remaining sides of the case being relatively long and narrow and longitudinally divided into pairs of coextensive parts, said hinge means comprising hinges connecting the parts of one of said remaining sides respectively to said large sides, and comprising a hinge connection between the parts of said one remaining side.

15. The invention as defined in claim 5 in which the releasable means for holding the said large sides in convergent back-to-back relation include an articulated strut having relatively movable members respectively connected to the lower ends of said parts.

16. The invention as defined in claim 5 in which the releasable means for holding the said large sides in convergent back-to-back relation include an articulated strut having relatively movable members respectively connected to the lower ends of said parts, and in which there is a foot carried by said strut, adapted to depend therefrom and engage the ground when the strut is holding the sides back-to-back, said foot providing with said wheels a three-point support for the cart.

17. The invention as defined in claim 15 in which the members of the strut are pivotally joined together and movable between a collapsed, folded position and an extended position, and in which there are releasable means locking said members in either of said positions.

18. The invention as defined in claim 15 in which the members of the strut are pivotally joined together and movable between a collapsed, folded position and an extended position, and in which there are releasable means independent of said strut, for holding the parts of said one side of the case in closely juxtaposed positions when the case is closed.

19. The invention as defined in claim 3 in which the means holding the sides in divergent positions includes a strut connected with said wheel-mounting means and removable therewith.

References Cited in the file of this patent

UNITED STATES PATENTS

| | | |
|---|---|---|
| 1,637,538 | Sampson | Aug. 2, 1927 |
| 2,070,254 | Burgner | Feb. 9, 1937 |
| 2,590,178 | Jamison | Mar. 25, 1952 |